May 14, 1957  A. J. STOCK  2,792,150
BULK MATERIAL VALVE
Filed Feb. 4, 1955  3 Sheets-Sheet 1

INVENTOR
Arthur J. Stock
BY Stevens, Davis, Miller and Mosher
ATTORNEYS

May 14, 1957 A. J. STOCK 2,792,150
BULK MATERIAL VALVE
Filed Feb. 4, 1955 3 Sheets-Sheet 2

INVENTOR
*Arthur J. Stock*
BY *Stevens, Davis, Miller & Mosher*
ATTORNEYS

May 14, 1957 A. J. STOCK 2,792,150
BULK MATERIAL VALVE
Filed Feb. 4, 1955 3 Sheets-Sheet 3

INVENTOR
Arthur J. Stock
BY
Stevens, Davis, Miller and Mosher
ATTORNEYS

United States Patent Office 2,792,150
Patented May 14, 1957

2,792,150

BULK MATERIAL VALVE

Arthur J. Stock, Cleveland, Ohio

Application February 4, 1955, Serial No. 486,131

13 Claims. (Cl. 222—108)

This invention relates generally to apparatus for controlling the flow of bulk material such as coal, coke, sand, limestone, and the like from storage bins or hoppers, and more particularly to a valve having novel structural features to be used for this purpose.

More particularly, this invention relates to what is known in the trade as a "rack and pinion bulk material valve or gate." Such a valve may include a plate or gate which is moved across an opening to regulate the flow of bulk material therethrough. The plate or gate is normally operated by means of a rack and pinion arrangement, and a dust-tight housing is usually provided to enclose the entire assembly. Valves of this design frequently become difficult to operate after a period of time because of the accumulation of dust in the gearing. As the valve is operated, dust accumulates in the clearance space between the pinion and the rack mechanism and makes the valve difficult, if not impossible, to operate. If the racks are made of cast-iron, as is often the case, the teeth may actually be broken by the excessive pressure resulting from the extra force necessary to move the gate.

This invention constitutes an improvement over the valve structure of the applicant as described and claimed in Patent No. 2,238,296, issued April 15, 1941.

Accordingly, therefore, the primary object of this invention is to provide a valve structure which will operate easily and efficiently despite the use thereof in connection with pulverulent, dusty material. This is accomplished by correlation of the racks and pinion gear dimensions so that dust accumulation will not interfere with the operation thereof, and by the remote placement of these parts with respect to the material being handled by the valve.

Another object of this invention is to provide a simple valve structure which can be built easily and economically. By providing a very deep U-shape to the valve gate, the pinions and rollers may be kept at a level substantially above the horizontal plane of the bottom of the inlet conduit. Heretofore, it has been necessary to locate the rack either on the lower side of the lip of the gate or on the bottom thereof in order to prevent dust accumulation on the rack. Inasmuch as the pinion is rotated, better results were obtained in these prior art designs by having the teeth of the rack project downward and allowing any accumulated dust to settle on the top of the pinion. With the racks thus located on the underside of the lip of the gates, it was impossible to provide a very deep U-shape to the gate in those cases where the pinions were mounted on a common shaft. Consequently, such a prior art design did not give the needed protection to either the gate supporting rollers or the pinions. In order to provide a deeper U-shape to the gates, to raise the supporting rollers and pinions substantially above the horizontal plane of the bottom of the inlet skirts, it had been necessary to mount the pinions on stub shafts and drive the stub shafts through a gear train on both sides of the valve, thus substantially increasing the complexity and cost of the assembly.

The present invention mounts the pinions above the rack and by this means provides an assembly that is self-cleaning. As a result, the pinions may be mounted on a common shaft instead of on stub shafts and the depth of the U is such that the supporting rollers and pinions are located on a level substantially above the horizontal plane of the lower edge of the inlet skirts.

Another object of this invention is to provide a shut-off valve so constructed that the accumulation of dust in the portion of the valve into which the gate moves when it is opened will be nearly completely eliminated. Thus the gate can always be fully opened because such material will be sufficiently removed not to interfere with the movement of the gate. Unless the valve is made with a very large face-to-face dimension the lower portion of this part of the valve body must be made fairly flat, and as a result the accumulation of dust or other material in this pocket has made it difficult in the past to open the gate completely.

Still another object of this invention is to provide a shut-off gate so constructed that it can be faced with a liner of stainless steel or other corrosion resistant material in such a way that the moisture entrained in the bulk material cannot contact and corrode the low carbon steel or other metal of which the gate is fabricated.

Other and further objects and advantages of the present invention will become apparent from the following detailed description of the invention taken in conjunction with the appended drawings, which form a part of the specification and in which:

Figure 5 is an enlarged section through the shaft, pinion and rack taken along the plane 5—5 shown in Figurge 3.

Figure 1:
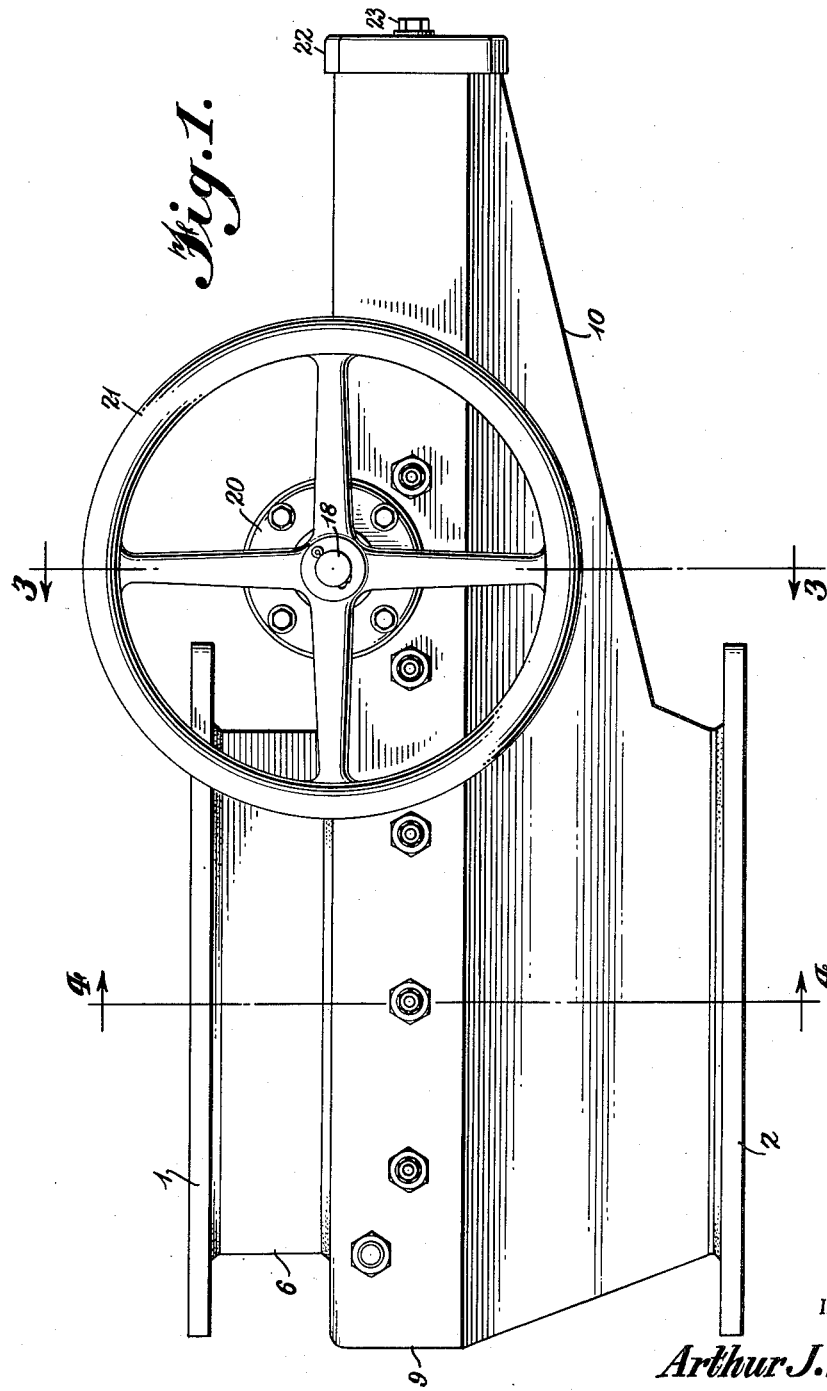
Figure 1 shows a side elevational view of a preferred embodiment of the present invention.
Figure 2:
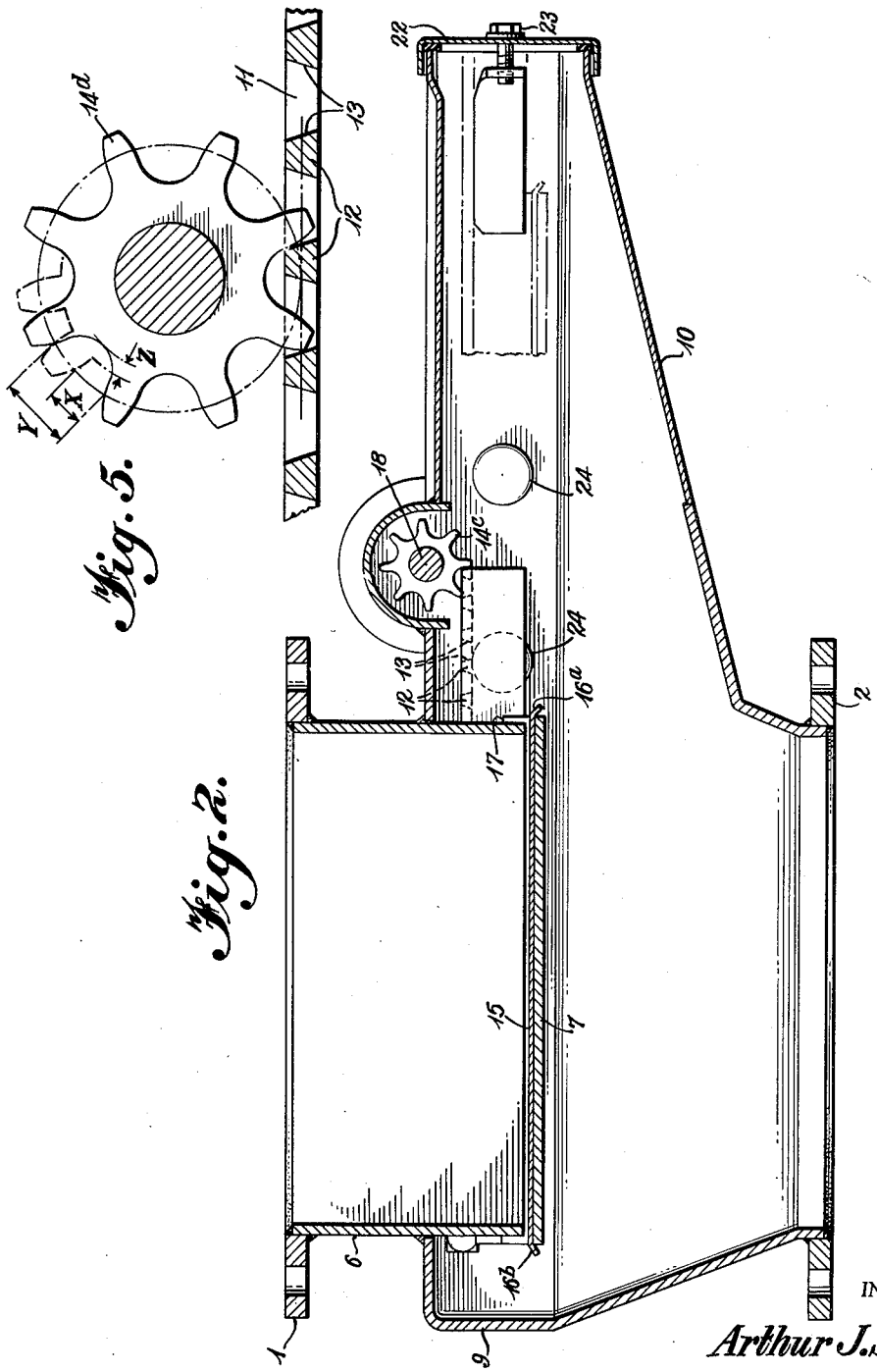
Figure 2 shows a longitudinal sectional view of the embodiment shown in Figure 1.

Turning now to the drawings and more particularly to Figures 1 and 2, there is shown one embodiment of the invention provided with a top flange 1 which is normally bolted to the outlet flange of a bin or hopper (not shown) which contains a quantity of coal or other bulk material. The valve disclosed in this specification is used to control the flow of bulk material out of such a bin or hopper.

When the gate of the bulk material valve is open, the material within the hopper is allowed to flow down through an outlet opening provided with a bottom flange 2. Generally, the bottom flange 2 is affixed to a delivery chute, down-spout or other similar apparatus to deliver the coal or bulk material to the point of use. Since the details of the overhead bin or hopper, as well as the structure of the outlet chute or down-spout are conventional and are well known to those skilled in the art, it is not believed necessary to provide a detailed description thereof in this specification.

The inlet of the valve consists of a short conduit or skirt section 6 through which the coal or other bulk material may pass. The flow through the inlet conduit is controlled by a shut-off gate 7 shown most clearly in Figure 2. Welded to the inlet conduit are sides 8, closure end 9 and a fourth side indicated generally as 10, all of which are welded to the outlet flange 2 to form a main frame which comprises a substantially dust-tight enclosure.

The shut-off gate 7 is made from a piece of steel or other suitable material in the shape of a deep U. Along the outer edges of the outwardly extending flanges which form the top sides of the U there is provided a series of substantially rectangular holes 11 as shown in Figure 5. The solid portions, or "lands" between the outer and inner portions of the gate, which form the wall sections for the holes, are shown by the numeral 12. The faces of the holes 11 are bevelled as shown at 13, in order to provide the proper contact surface for the teeth of the operating pinion 14d. The operation pinions 14a, 14b, 14c and 14d, are made comparatively thin and are used in multiple to provide sufficient strength.

Figure 3:
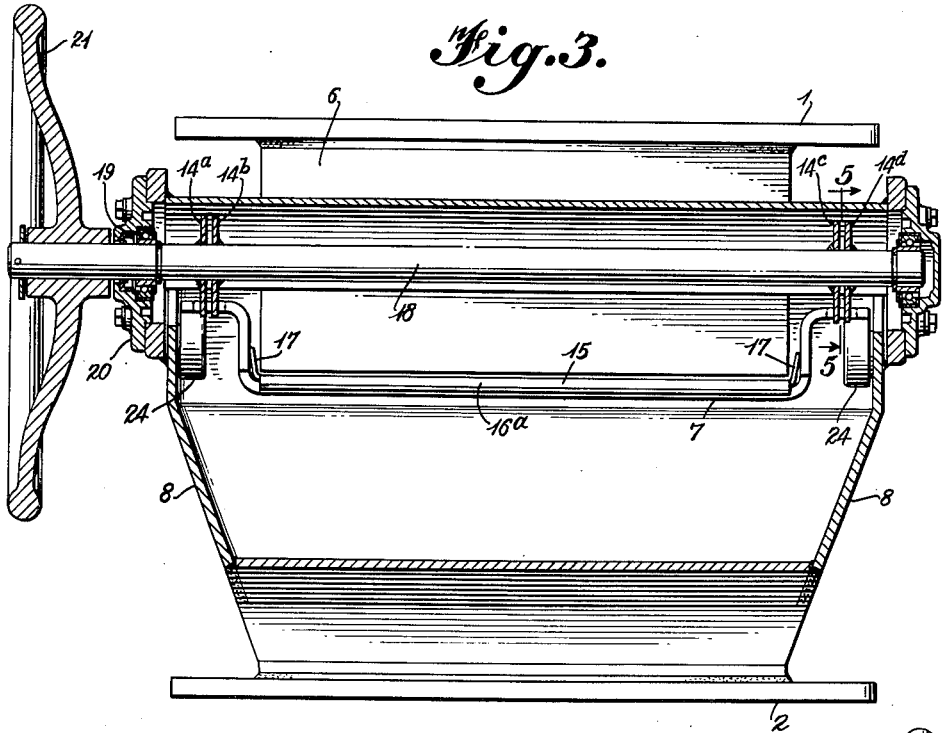
Figure 3 is a vertical section through the operating shaft taken along the plane 3—3 in Figure 1 and looking in the direction of the arrows.
Figure 4:
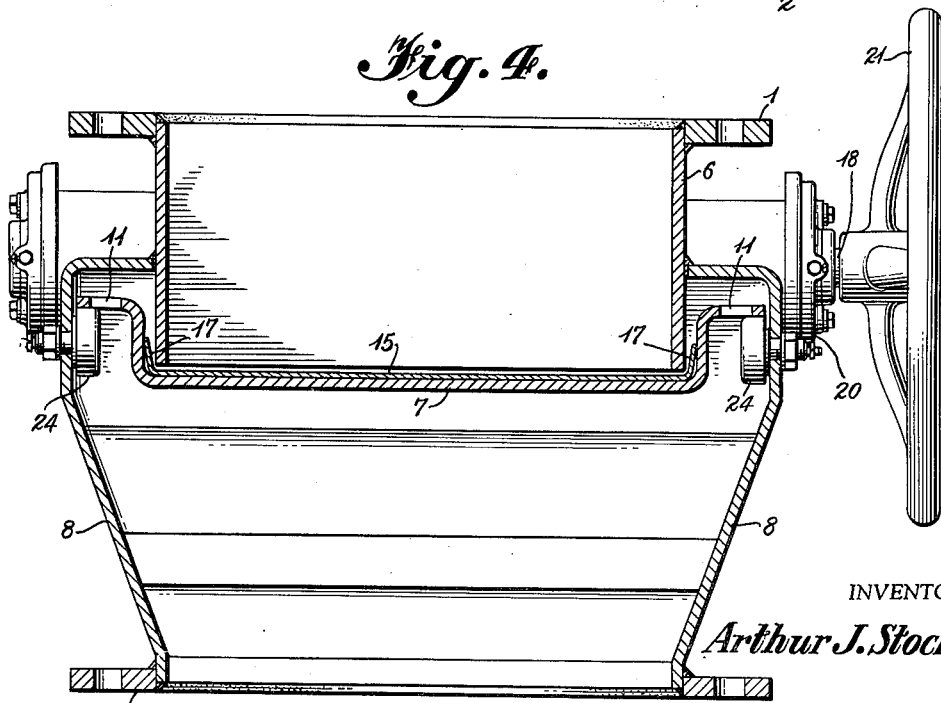
Figure 4 is a vertical sectional view taken along the plane 4—4 shown in Figure 1, and looking in the direction of the arrows.

The shut-off gate 7 may be provided with a stainless steel liner 15 which is provided with a downwardly bent edge portion 16a as shown in Figure 2. Because of the downward tilt of edge portion 16a, bulk material accumulated in that portion of the valve body into which the gate moves in being opened will be forced up on top of the gate as the gate is opened. Conversely, when the gate is closed, this material is shoved off the gate at a point where it will fall down the outlet of the valve. Thus, accumulations of dust or other bulk material in that part of the valve can not prevent the full opening of the gate, and, therefore, considerably flatter surfaces in that part of the valve body may be employed. The over-all face-to-face dimension of the valve may thus be reduced without getting into difficulty because of the inability of the gates to open fully on account of such accumulated material. The liner 15 is also provided with a downwardly bent portion 16b. These downwardly bent portions 16a and 16b provide drip ledges so that any moisture contained within the coal will drop off the ledges instead of running under the gate proper and corroding the gate. Also, the portion 16a assists in cleaning out any dust or bulk material accumulation in the end of the valve opposite the closure end as previously described. Additionally, the liner 15 is bent up along the sides, as shown by the numeral 17 in Figures 3 and 4, so that it will nest in gate 7. It will be appreciated that where it is desired to practice the invention without the use of the liner 15, the edge portions of the gate itself may be provided with suitable downwardly bent sections.

The operating pinions 14a, 14b, 14c, and 14d, may consist of relatively thin gear-sections welded to each end of the operating shaft 18. These pinions are relatively thin so they can be assembled on the shaft with a space therebetween to allow any dust that may lodge on a pinion tooth or on the rack to move sideways and thus eliminate binding between these two parts. It will be appreciated, of course, that more than two pinions may be welded to each end of the rod 18 and that the number of pinions so used may vary with the size of the valve so that the total face area of the pinions is sufficient to stand the loading stresses imposed thereupon. The location of the pinions 14a, 14b, 14c and 14d above the associated mating rack sections is clearly shown in the drawings Figure 3 and Figure 5. This overhead construction is made possible by using rack sections as above-described without a bottom or root section. The location of the pinions above the rack sections is a very economical method of construction where deep U-shaped gates are used. The reason for this statement is the fact that where the pinions are placed beneath the rack, as in the cases where a conventional solid-bottom rack tooth is utilized, it becomes necessary to mount the pinions on a pair of stub shafts, as earlier explained, and drive the stub shafts through a gear train from a common cross operating shaft. It will readily be observed that this is a much more complicated and expensive arrangement.

Also, it will be appreciated that the invention is not limited to the use of thin pairs of individual gear sections and that the pinions may be made from solid steel and provided with one or more deep annular clearance grooves so that lateral clearance is provided exactly as with two or more separate gear sections.

Continuing now with the detailed description of the invention, it has been found desirable to increase the space between the teeth of the pinions 14a, 14b, 14c, and 14d.

Referring now to Figure 5, the standard pinion gear profile is indicated by dotted lines and the standard tooth space is indicated by the dimension X. By reducing the number of teeth and maintaining the same pitch diameter, it is possible to increase the tooth space to dimension Y. It is contemplated that dimension Y, the space between the teeth, may actually be increased by an amount 2X. In other words, efficient operation has been secured by providing as a pinion, an involute spur gear having at least twice the normal space between the gear teeth. It will be readily appreciated, however, that a tooth width of less than twice-normal may be used, and that the tooth spacing of the holes 11 in the rack section must also be lengthened to provide ample clearance. This may be accomplished by providing a linear distance between rack teeth which equals the length of arc between pinion or gear teeth, measured on the pitch circle thereof. This prevents binding between the teeth of the pinion and rack because of the additional clearance provided. In addition, the greater tooth space allows the root of the tooth form to be cut much lower than standard, such as indicated by the dimension Z in Figure 5. It is contemplated that dimension Z may be extended to a depth of one-half the radial height of a gear tooth, or more.

This increased root clearance provides a space into which dust or larger particles may move instead of remaining between the mating surfaces of the racks and pinions. Thus, binding of these two latter mentioned parts is eliminated.

The operating shaft 18, the shaft bearings and seals 19, the shaft bearing holder 20, and the operating hand wheel 21 are all of conventional construction known to those skilled in the art and require no detailed description herein. Likewise, the end cover assembly 22 and its associated holding screws 23, as well as the eight supporting rollers 24 are all of conventional construction known in the art. The frame of the valve is built up of a number of plates as earlier indicated, joined in such a manner that the entire structure is dust-tight.

The bulk material valve described in this application has been found to be particularly easy to operate when handling dusty materials because of the substantial clearances which have been provided to allow dust accumulations to migrate away from the contact surfaces between the pinion and rack teeth. Since the racks provided in this invention have no bottom, dust particles will fall completely through and cannot accumulate in the root section, as in the case of an ordinary rack. Moreover, the placement of the pinions above the rack prevents dust from accumulating on any of the pinion teeth when the pinions are moved. Additionally, the multiple narrow faces of the pinions allow dust particles to move laterally away from the contact surfaces and keep them clear for effective traction. The substantially increased space between the teeth of the pinions and also between the pinion and rack teeth when engaged, give ample space into which dust may move and thus eliminate binding between the parts. The net result of the ample clearances provided in this invention is that no possible accumulation of dust can cause difficult operation of the gate.

It will be obvious to those skilled in the art that the invention is by no means limited to use in connection with coal, coke, limestone or similar materials, and that the construction can readily be applied in controlling the flow of any other bulk material such as grain, fertilizer, chemicals, and the like.

Therefore, while I have illustrated and described a practical and efficient form of embodiment of my invention suitable for the proposed uses, it will be understood that certain changes, alterations, modifications and substitutions can be made without departing from the spirit and scope of the appended claims.

I claim as my invention:

1. In a bulk material valve of the character described, a main frame, an inlet conduit adapted to vertically penetrate the upper surface of said main frame, a shut-off gate slidably disposed beneath said inlet conduit and characterized by a substantially U-shaped cross-section with a flat flange section extending normally from each side of the U-portions and integrally attached thereto, said flange sections having each a plurality of longitudinally disposed rectangular holes located therein, a plurality of rollers mounted within said main frame to support said flange sections, an operating shaft journaled for rotation in said main frame, a plurality of pinion gears affixed to opposite ends of said operating shaft to engage said rectangular holes in said flange sections when said shaft is rotated, and, a hand wheel affixed to said operating shaft to actuate said pinion gears and effect sliding movement of said shut-off gate.

2. In a bulk material valve of the character described, a main frame comprising a substantially dust-tight casing provided with an outlet opening, an inlet conduit adapted to penetrate the upper surface of said main frame and extend downwardly therethrough, a substantially U-shaped shut-off gate having a flat horizontal portion slidably disposed across the lower plane of said inlet conduit and vertical portions upwardly extending in parallel with the walls of said downwardly extending inlet conduit, a pair of flanges, each of said flanges integrally attached perpendicularly to one of said vertical portions of said shut-off gate and provided with a series of oblong holes, a plurality of rollers operatively mounted within the inner walls of said casing to slidably support said shut-off gate, an operating rod rotatably mounted in said casing, a plurality of pinion gears mounted on said operating rod above said flanges to engage said holes therein and impart linear motion to said shut-off gate when rotated, a U-shaped liner adapted to nest in said shut-off gate and provided with a downwardly extending edge portion to overhang both ends of said shut-off gate and provide drainage therefor, and, a hand wheel operatively connected to said operating rod to supply torque thereto and effect linear motion of said shut-off gate to control the flow of bulk material through said bulk material valve.

3. In an apparatus for controlling the flow of bulk material therethrough, a main frame comprising a dust-tight casing provided with an outlet opening therein, an inlet conduit adapted to vertically penetrate the upper portion of said casing and extend downwardly therethrough in parallel with a portion of the walls of said casing, an operating rod rotatably mounted in said casing, a hand wheel operatively affixed to said operating rod for manual rotation of same, a plurality of rollers mounted upon the inner walls of said casing, a U-shaped shut-off valve with a flange integrally affixed to the upper portion of each vertically extending leg thereof; said flanges each slidably supported on said rollers and provided with a longitudinally aligned plurality of oblong holes defining rack sections therein, and, a plurality of pinion gears affixed to transversely opposite sides of said operating rod above said flanges to engage said rack sections therein and impart linear motion thereto.

4. In an apparatus for regulating the flow of pulverulent granular particles of bulk material, support means comprising a dust-tight casing with an egress hole therein, inlet means provided with ingress to said support means, valve means provided with a bottomless rack means and adapted to move across the lower plane of said inlet means and completely subtend the area defined by the periphery thereof, pinion means operatively mounted above said rack means to engage same, and, means to supply torque to rotate said pinion means to move said rack means and its associated valve means, whereby accumulations of said pulverulent granular particles between said bottomless rack means and said pinion means are effectively prevented.

5. In an apparatus for controlling the flow of pulverulent bulk material through a valve provided with a casing and an inlet conduit partially extending therethrough, a plurality of rollers affixed to the inner wall surfaces of said casing, a shut-off valve characterized by a substantially U-shaped cross section and provided with an outwardly extending flange section integrally affixed to each leg of said U-section, said flanges provided each with a plurality of flat-sided holes to define a rack section, a plurality of pinion gears operatively mounted above said rack section to engage same and impart linear motion thereto, and, means to supply torque to said pinion gears to effect said linear motion of said rack section and shut-off valve associated therewith.

6. In a device for handling pulverulent bulk material, a shut-off gate having a substantially U-shaped cross-sectional profile with a flange outwardly extending from the top of each leg of said U-section, said flange provided with a plurality of longitudinally aligned rectangular holes defining a bottomless rack, whereby said pulverulent material may drop free of and completely through said bottomless rack.

7. In a bulk material handling apparatus having a substantially U-shaped shut-off gate provided with a longitudinally aligned series of flat sided holes on each side thereof, an operating rod, a set of pinions to engage each of said series of holes respectively, each of said sets comprising at least two thin, flat gear sections affixed to opposite ends of said operating rod with a space therebetween, and, a hand wheel operatively mounted to supply torque to said rod and rotate said pinions in engagement with said flat-sided holes.

8. In a bulk handling apparatus having a shut-off gate provided with a plurality of longitudinally extending flat-sided holes to define a bottomless rack, an operating rod, a plurality of gear-sections mounted on opposite ends of said operating rod, above said rack to rotate into engagement, the successive teeth on said gear sections simultaneously entering said flat-sided holes to actuate said bottomless rack thereby.

9. In a bulk material handling device characterized by a shut-off gate provided with bottomless rack sections on transversely opposite sides thereof, an operating rod, a pair of gears mounted on opposite sides of said operating rod to engage said bottomless rack sections respectively, each of said gears including at least one deep annular recess therein to allow axial displacement of pulverulent material accumulated between said racks and said gears.

10. In a bulk material handling device characterized by a U-shaped shut-off gate provided with a bottomless rack section on each oppositely disposed parallel flange section thereof, an operating rod, a pair of gears mounted on opposite sides of said operating rod to engage respectively, each of said rack sections, said gears each having a plurality of deep annular recesses therein to provide lateral access for said bulk material therethrough and define a plurality of narow multiple gear faces to deliver torque to said rack sections when engaged therewith.

11. In an apparatus for regulating the flow of pulverulent bulk material, a casing with an outlet opening, an inlet conduit, a shut-off gate slidably interposed between said outlet opening and said inlet conduit, said gate comprising a flat horizontal oblong portion provided with a pair of wall sections vertically disposed with respect thereto and integrally joined therewith, said flat oblong portion further provided with a downwardly obliquely bent edge section on those edges normal to the plane of said wall sections, a pair of flat horizontal flanges perpendicularly disposed with respect to said wall sections and integrally secured thereto, said flanges provided each with a bottomless rack section, and, a hand wheel for actuating said shut-off gate whereby said edge section closest said hand wheel acts to remove dust and pulverulent material accumulated in the space which said shut-off valve occupies during the open position thereof.

12. In a device for regulating the flow of bulk material, a dust-proof casing provided with an outlet opening, an inlet conduit, gate means slidably interposed between said outlet opening and said inlet conduit, said gate means including a flat oblong portion provided with a pair of perpendicular wall sections integrally attached thereto, a pair of flat flange sections perpendicularly disposed with respect to said wall sections and integrally attached thereto, said flange sections provided each with a series of oblong holes defining a rack section, pinion means to engage and drive said rack sections, a flat stainless steel liner provided with upturned opposite edges and mounted to nest within said gate means, said liner further provided with a pair of downwardly inclined edge portions perpendicular to the planes of said upturned edges to effectively drain exces moisture from said valve assembly and inhibit corrosion of said valve material thereby.

13. In an apparatus for handling pulverulent bulk material, a shut-off gate having a substantially U-shaped cross-sectional profile with a pair of outwardly extending flanges integrally affixed to the top of each side of the U-portion thereof, said flanges provided each with a plurality of oblong holes defining a rack section, said rack section characterized by a tooth spacing of twice the normal spacing for an involute gear rack section, an operating rod journaled for rotation in said apparatus, a plurality of pinion gears of fixed diameter secured to said operating rod to engage said rack and characterized by a tooth spacing twice the normal involute gear spacing for said fixed diameter, said gears further characterized by a root depth of at least half the radial height of the teeth of said pinion gears.

References Cited in the file of this patent
UNITED STATES PATENTS

| | | |
|---|---|---|
| 760,772 | Anderson et al. | May 24, 1904 |
| 1,469,673 | Moraine | Oct. 2, 1923 |
| 2,020,863 | Willoughby | Nov. 12, 1935 |
| 2,238,296 | Stock | Apr. 15, 1941 |